US008726257B2

(12) United States Patent
Kilbane et al.

(10) Patent No.: US 8,726,257 B2
(45) Date of Patent: May 13, 2014

(54) FILE ATTRIBUTES FOR FLEXIBLE LINKING

(75) Inventors: Stephen M. Kilbane, Edinburgh (GB);
Alexander Raikman, Mansfield, MA (US)

(73) Assignee: Analog Devices, Inc, Norwood, MA (US)

( * ) Notice: Subject to any disclaimer, the term of this patent is extended or adjusted under 35 U.S.C. 154(b) by 1008 days.

(21) Appl. No.: 11/584,147

(22) Filed: Oct. 20, 2006

(65) Prior Publication Data

US 2008/0098378 A1     Apr. 24, 2008

(51) Int. Cl.
*G06F 9/44*     (2006.01)
*G06F 9/45*     (2006.01)

(52) U.S. Cl.
USPC ........... 717/162; 717/100; 717/108; 717/140; 717/143

(58) Field of Classification Search
None
See application file for complete search history.

(56) References Cited

U.S. PATENT DOCUMENTS

| 5,950,000 | A  | * | 9/1999  | O'Leary et al. | 717/105 |
| 6,438,743 | B1 | * | 8/2002  | Boehm et al.   | 717/122 |
| 7,631,292 | B2 | * | 12/2009 | Chen           | 717/108 |
| 7,676,800 | B2 | * | 3/2010  | Kinney         | 717/162 |
| 8,104,025 | B2 | * | 1/2012  | Hogg et al.    | 717/140 |
| 2005/0027953 | A1 | * | 2/2005 | McIntosh et al. | 711/158 |
| 2005/0028151 | A1 | * | 2/2005 | Roth et al.     | 717/162 |
| 2005/0081141 | A1 | * | 4/2005 | Jonsson         | 715/503 |
| 2005/0166196 | A1 | * | 7/2005 | Grier et al.    | 717/162 |
| 2005/0210439 | A1 | * | 9/2005 | Dimpsey et al.  | 717/100 |
| 2005/0240897 | A1 | * | 10/2005 | Kailas         | 717/100 |
| 2007/0044066 | A1 | * | 2/2007 | Meijer et al.   | 717/100 |
| 2007/0055965 | A1 | * | 3/2007 | Colyer          | 717/143 |

OTHER PUBLICATIONS

Wikipedia, Boolean Expression, online retrieved on Mar. 19, 2012, 2 pages, <http://en.wikipedia.org/wiki/Boolean_expression>.*
Dunkels et al., Run-time dynamic linking for reprogramming wireless sensor networks, Oct. 2006, 14 pages.*
C. Platen et al., Feedback linking: optimizing object code layout for updates, Jul. 2006, 10 pages.*
"A.out(5), FreeBSD File Formats Manual," Mar. 16, 2007, 6 pages, Panagiotis, Christias. Mar. 16, 2007 <http://fuse4bsd.creo.hu/localcgi/man-cgi.cgi?a.out+5>.
"Common Object File Format (COFF)," 2007, 3 pages, Microsoft Corporation. Mar. 16, 2007 <http://support.microsoft.com/kb/121460>.
Tool Interface Standards (TIS), Executable and Linking Format (ELF) Specification, May 1995, 106 pages, TIS Committee, Version 1.2.
Bourne, S.R., "The Unix System," 1982, p. 244, Bell Telephone Laboratories, Inc., New Jersey, USA.
Welsh, Matt, et al., "Running Linux," 1999, p. 374, 3rd Edition, O'Reilly & Associates, Sebastopol, CA, USA.
Van Der Linden, Peter, "Expert C Programming, Deep C Secrets" 1994, p. 117, Prentice Hall, Englewood Cliffs, NJ, USA.
Aho, Alfred V., et al., "Compilers: Priciples, Techniques, & Tools," 2007, p. 19, 2nd Edition, Pearson Eduction, Inc., Boston, MA, USA.

(Continued)

*Primary Examiner* — Thuy Dao
(74) *Attorney, Agent, or Firm* — Patent Capital Group (57) ABSTRACT

The object file format and linker are enhanced to provide file attributes to allow flexible selection and placement of objects.

18 Claims, 5 Drawing Sheets

(56) References Cited

OTHER PUBLICATIONS

Muchnick, Steven S., "Advanced Compiler Design Implementation," 1997, p. 127-131, Morgan Kaufmann Publishers, San Francisco, CA USA.

Tanenbaum, Andrew S., et al., "Operating Systems: Design and Implementation," 2006, p. 383-396, 3rd Edition, Prentice-Hall, Inc., Upper Saddle River, NJ, USA.

Van Der Linden, Peter, "Expert C Programming, Deep C Secrets" 1994, p. 110, Prentice Hall, Englewood Cliffs, NJ, USA.

* cited by examiner

FILE ATTRIBUTES FOR FLEXIBLE LINKING

BACKGROUND OF INVENTION

1. Field of Invention

This invention relates to linkers and, more particularly, to methods and apparatus for providing dynamic and extensible attributes to object files to make the linking process more flexible.

2. Background of the Invention

Modern software is often developed in a modular fashion, using a combination of custom code written for the particular application and generic code that may be used in many applications. Reusable modules are often packaged in libraries and distributed either in source code or object code format. In the source code, software in one module calls components of another module through symbolic references. For example, an application that performs digital signal processing might call a standard Fast Fourier Transform component of a standard module by calling the component by its function name in the source code, e.g., fft( ).

Compiling and Linking

The process of building a final executable application from individual source code files involves several steps, which are usually performed by a set of programmer tools designed for that purpose. Source code files are typically compiled into object files individually, and then combined by a linker to make a single executable binary. The linker performs at least two separate functions. First, the linker must satisfy references that are undefined within a source code module. In the example above, if the source code to the digital signal processing application calls the fft( ) function, the linker must satisfy that symbolic reference by locating a suitable definition of the function in one of the other modules involved in the linking process. In effect, the linker must match the definition of a symbol to all the uses of that symbol elsewhere in the source code. If a symbol is referenced but is not defined anywhere else in the source code, the linker may signal the user with a warning or error message that it was unable to resolve the symbolic reference.

Figure 1:
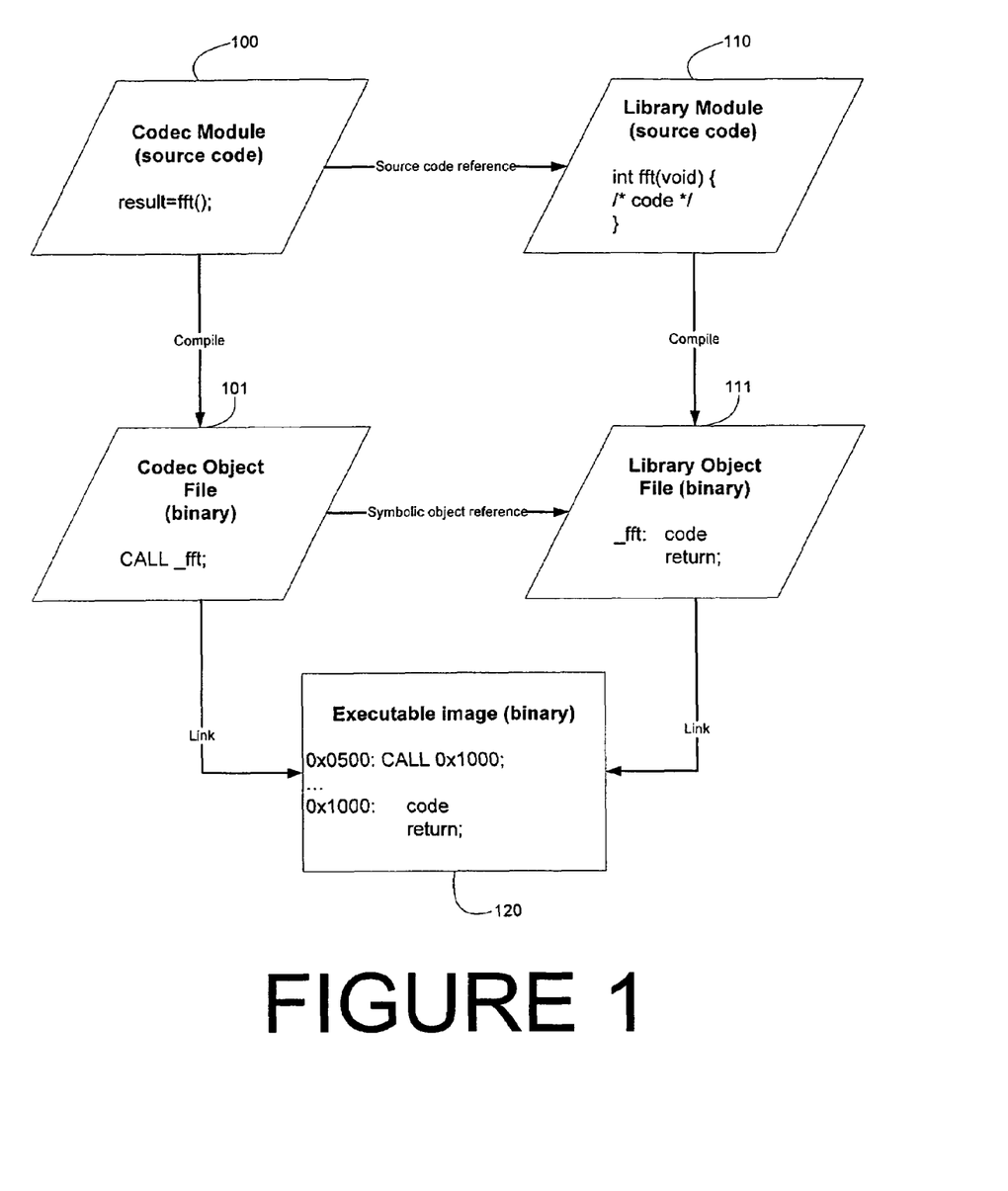
FIG. 1 is a general overview of the compiling and linking process.

Second, the linker must resolve symbols to memory addresses. After identifying and resolving all of the required components, the linker must arrange those components within the memory space of the application. Each component is given a memory address. As in the example above, the fft( ) function could be given a memory address of 0x1000. Once all of the components are given memory addresses, the linker converts all of the symbolic references within the application into those memory addresses so the application can be executed by a CPU. In the fft( ) example, each symbolic reference to the function fft( ) could be resolved to reference the memory address 0x1000. FIG. 1 illustrates the process of compiling source code, resolving symbolic references, and linking into an executable image file.

Static and Dynamic Linking

Linking can be static or dynamic. A static linker bundles a component together with the components it references, as well as all components referenced by those components, until all of the necessary modules are contained in a single executable. Static linking allows the developer to distribute a single binary without needing to ensure that other dependencies already exist on a target system. Static linking, in some cases, also results in performance gains. On the other hand, static linking may require more memory and disk space than dynamic linking. Dynamic linking means that the data in a library is not copied into a new executable or library at compile time, but remains in a separate file on disk. In this case, the linker only records what libraries are required when the application is compiled and the tasks of satisfying undefined references and resolving symbols to memory addresses is done when the application is executed (i.e., at runtime). Dynamic linking allows the same library to be used by multiple applications, thereby conserving disk space and potentially memory.

Libraries

A library is a collection of functions or procedures used to develop applications. It is common to organize several related functions together into a single library. For example, the fft( ) Fast Fourier Transform routine discussed above may be grouped with several related functions used in digital signal processing. A programmer developing a digital signal processing application can then include the digital signal processing library in his application and reference functions defined in that library without having to redefine those functions for each new application.

During the linking process, the linker searches through all included libraries in order to resolve any references made by the application to symbols that are not defined in the application itself. The linker may also perform the task of searching through a list of directories to find the required libraries. As discussed above, the linking may be either static or dynamic.

Libraries provide a means for organizing code and data. Routines with similar characteristics are often collected into a single library. When an application includes multiple libraries, the linker will search these libraries in some defined order to determine which library contains the definition necessary to resolve a particular reference. Linkers are commonly provided with a search order, either by default or by the programmer, for performing this search. Once the linker finds a definition for an unresolved symbol, it usually stops searching at that point, and thus the first library in the search order that provides a particular definition is used, even if other libraries later in the search order also contain definitions for that same symbol. Since the same symbol may have different definitions in several libraries, the programmer can control which symbol definitions will be used to a limited extent by altering the specified search order.

Libraries may be divided along several different conceptual categories. For example, libraries for the Analog Devices Blackfin processor are divided among functional, performance, and target-processor boundaries. As an example of a functional division, there are libraries that handle input/output functions and other libraries that provide floating-point computation emulation functions. As an example of a performance division, there are libraries that implement floating-point computation according to different levels of precision and speed. As an example of a target-processor division, different libraries may contain definitions for the same symbols, with the functions in each library optimized to work on a particular processor or architecture. There are also alternative versions of libraries that provide the same symbol definitions with and without debugging information for the programmer.

Sections

When source code is compiled into object files, the contents of each object file are typically divided into several sections (or "segments"). Each section has its own symbolic name. The symbolic name for each section provides information to the linker on how the contents of that section must be processed. Usually, the compiler and the linker share a common lexicon for interpreting different section symbolic names. For example, the compiler may separate code and data into different sections, and the linker allocates different memory addresses to the contents of those sections based on the content type defined by the symbolic name for each section. This convention allows a linker to satisfy constraints imposed by the physical requirements of target hardware. For example, some processors require executable instructions (code) and data to be stored separately, and prohibit them from coexisting within the same area of memory. Once the compiler identifies sections of the object file as code and data, the linker can then allocate each section to the proper area of memory to function properly according to the target architecture's requirements.

Not all sections of an object file are necessarily mapped into the final executable file. For example, compiler-generated debugging information may be placed into sections that are not included in the final executable image. The programmer may configure the linker to include or exclude such debugging sections at link time.

Memory Areas and "Fall-Through"

Figure 2:
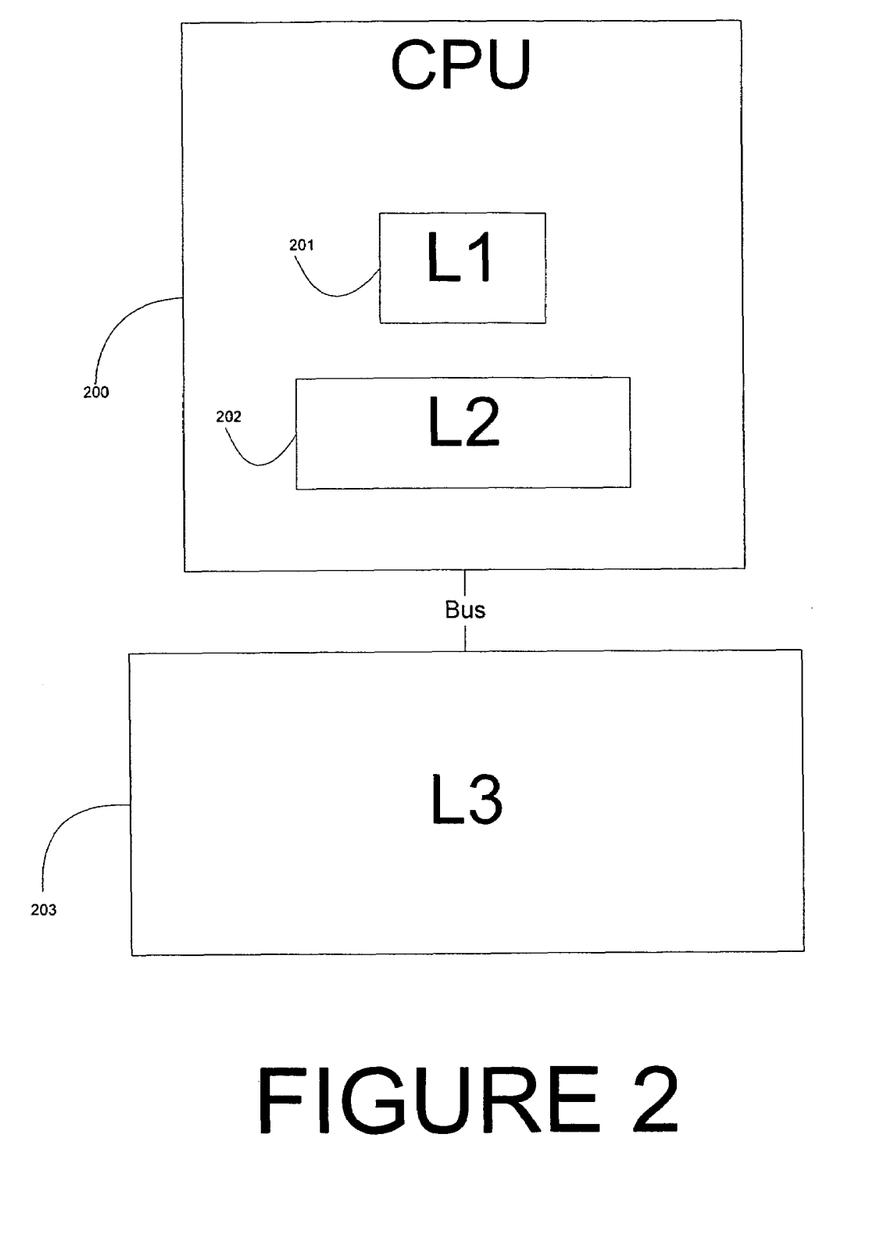
FIG. 2 is a schematic illustration of a CPU with two levels of internal memory cache and main memory accessible through a bus.

A computer processor typically has some memory on-chip with the processor and other memory off-chip that is reached through a system bus. The on-chip memory is generally faster but more expensive memory, while the off-chip memory is cheaper, slower, and can be much larger in size. These memory storage areas can be divided further. For example, it is common to have two or more levels of on-chip memory. Some models of Analog Devices, Inc.'s Blackfin processors have a memory hierarchy as depicted in FIG. 2, where L1 and L2 memory are physically located on the chip with the CPU, while L3 memory is external to the CPU. Ideally, code and data that are most often used by the CPU would be stored in the fastest L1 memory, closest to the CPU. Code and data used less often would be stored in L2 memory, and code and data used the least for a given application would be stored in L3 memory for optimal performance and resource usage. By locating code and data at various memory locations, a linker can assist in optimizing performance and resource use according to these parameters.

Embedded processors like Analog Devices Blackfin processors may have several different memory areas, each with different characteristics. It is common for memory areas to be have different properties such as whether they can be written to (or only read), how much storage they contain, or how quickly they can be accessed. For example, the following table illustrates a potential layout of memory for an Analog Devices Blackfin processor:

| Memory Area   | Content type | Access Kind | Size       | Speed     |
|---------------|--------------|-------------|------------|-----------|
| Internal Code | Code         | Read-only   | Small      | Fast      |
| Internal Data | Data         | Read-write  | Small      | Fast      |
| Local RAM     | Code/data    | Read-write  | Medium     | Medium    |
| External RAM  | Code/data    | Read-write  | Very large | Slow      |
| External ROM  | Code/data    | Read-only   | Large      | Very slow |

In order to build a functional application, the linker must observe any constraints on memory usage in locating sections. In the table above, for example, the linker must insure that the "content type" and "access kind" limitations are followed when locating sections of object files. Thus, object file sections marked as code must be placed only in memory areas that allow code and not in memory areas that are data-only. Similarly, data that needs to be written by the application can only be placed in a "read-write" area of memory, and not a "read-only" area.

In deciding where in memory to place code and data, linkers typically apply a "fall-through" approach. The linker first allocates sections to the fastest memory, and as that memory is filled up, it "falls through" to slower memory, allocating sections to the slowest memory last. This allocation must be done consistently with the other constraints discussed above. Accordingly, the linker might map sections to memory as shown in the following table:

| Section   | Maps to Section of Memory |
|-----------|---------------------------|
| Program   | (1) Internal Code         |
|           | (2) Local RAM             |
|           | (3) External RAM          |
|           | (4) External ROM          |
| data1     | (1) Internal Data         |
|           | (2) Local RAM             |
|           | (2) External RAM          |
| constdata | (1) Internal Data         |
|           | (2) Local RAM             |
|           | (3) External RAM          |
|           | (4) External ROM          |

As this table illustrates, when allocating object code in the "program" section, the linker will first attempt to place the code in the "internal code" memory area, since it is the fastest memory area and allows code. If the linker is unable to fit the "program" section in "internal code" memory, it will successively attempt to place the code in local RAM, external RAM, and external ROM until it has been successfully allocated to a particular area of memory. The same approach would be used for the other sections.

If the programmer allows the linker to place sections of object code in the default areas of memory, the performance of the resulting application may not be optimal. For example, code that is executed frequently might be placed in slower memory while code that is executed less frequently might be placed in faster memory. As another example, code that needs to be accessible to all cores of a multi-core CPU might be placed in memory that can only be accessed by one core. For these reasons, programmers often manually specify areas of memory other than the default area for placing sections of object files by placing explicit mappings within a linker configuration.

SUMMARY OF INVENTION

According to a first aspect of the invention, the object file format is enhanced and extended to permit the use of arbitrary symbolic file attributes. These attributes provide metadata that can be used by the linker to select objects and allocate resources more efficiently when placing object file sections in memory.

According to a second aspect of the invention, libraries are enhanced to include arbitrary file attributes. These file attributes can be used to describe aspects of each object within the library.

According to a third aspect of the invention, the linker is enhanced to provide a phase which applies attribute-based filters to the objects involved in the linking process. This phase eliminates some objects from consideration for particular mappings, and applies logical groupings to other mappings. The result allows for dynamic creation of virtual libraries that can fine-tune which symbols may be mapped to specific memory areas according to an application's specific requirements and/or the requirements of target hardware.

BRIEF DESCRIPTION OF DRAWINGS

For a better understanding of the present invention, reference is made to the accompanying drawings, which are incorporated herein by reference and in which.

DETAILED DESCRIPTION

This invention is not limited in its application to the details of construction and the arrangement of components set forth in the following description or illustrated in the drawings. The invention is capable of other embodiments and of being practiced or being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Compiling and Linking

FIG. 1 depicts the compiling and linking process as it is commonly used to build software applications. In this example, codec module 100 and library module 110 both represent source code files. The codec module 100 could be a component of a digital signal processing application that requires a Fast Fourier Transform function to complete its designated task. The codec module 100 thus includes a source code reference to the function fft( ), which is contained in a separate source code library module 110. The compiler translates the source code for the codec module 100 into an object file 101. Likewise, the library module 110 is compiled into an object file 111. At this point in the building process, the codec object file 101 has an unresolved symbolic reference_fft. That reference will be resolved to the definition for that reference in the library object file 111. The linker performs this resolution task and combines the two object files into a single binary executable image binary 120. The linker also locates the _fft reference in memory and converts all symbolic references to that function to a memory address. In the case of dynamic linking rather than static linking, the linker may not combine the files into a single executable but rather leave the reference unresolved until runtime. FIG. 1 is a greatly simplified example of the compiling and linking process, and those of ordinary skill in the art will readily appreciate that usually many more source code files are involved and different variations on the compiling and linking process are possible. Nothing in FIG. 1 is intended to be a limiting aspect of the invention.

Tiered Memory

FIG. 2 presents an example of a CPU 200 with two levels of memory on the chip with the CPU. These levels are depicted as L1 201 and L2 202. The CPU is connected to main memory 203 by a bus. Ideally, the data and code that is accessed most often will be closest to the CPU at L1 201, followed by the data and code that is accessed less often at L2 202, with the remaining data and code being stored at L3 203. Again, one of ordinary skill in the art will appreciate that this is a greatly simplified representation of a CPU and memory and that many variations are possible, including additional levels of memory, and multiple CPUs or multiple cores to a single CPU. Nothing in FIG. 2 is intended to be a limiting aspect of the invention.

Example Application Design

Figure 3:
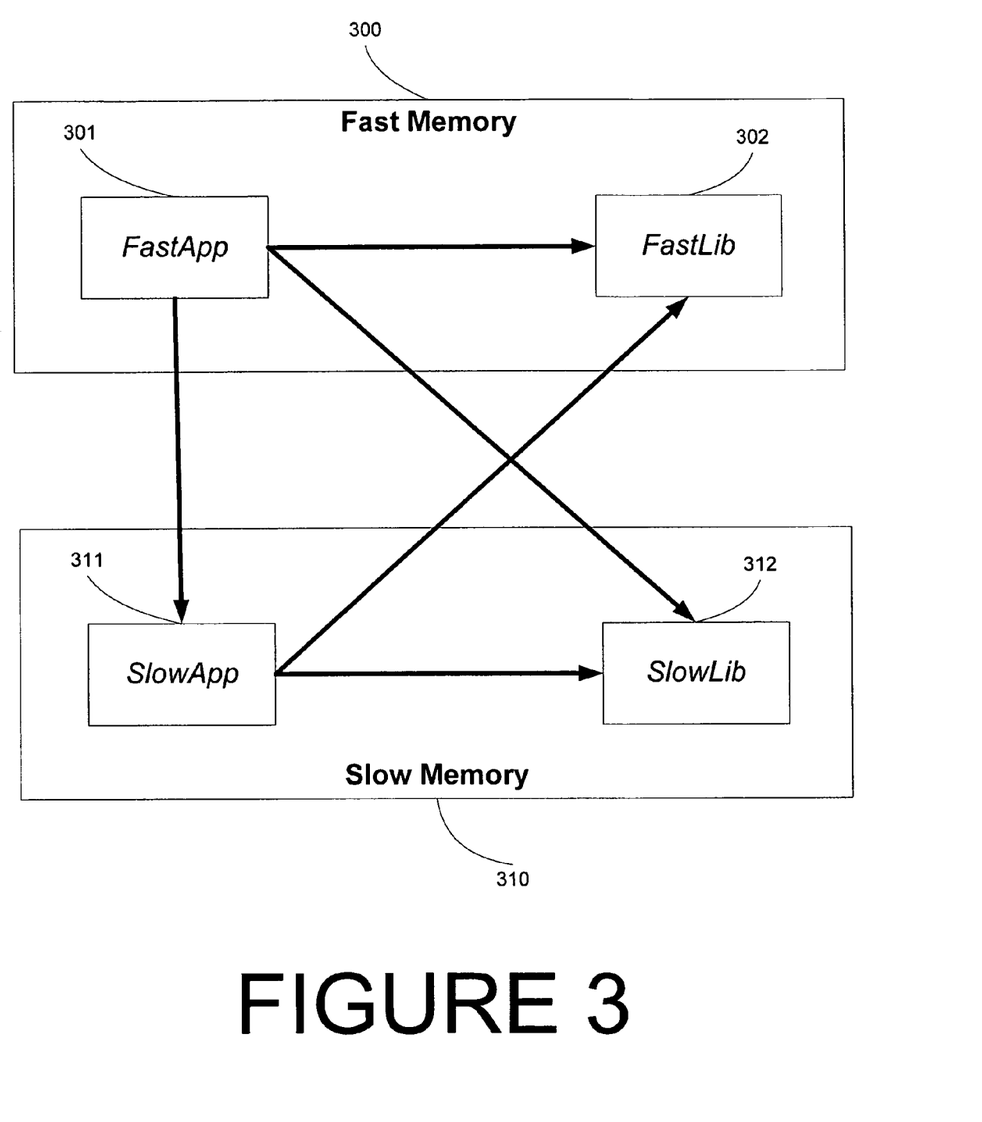
FIG. 3 is a schematic illustration of an application design in accordance with a preferred embodiment of the invention.

FIG. 3 depicts a simplified example application design in accordance with one embodiment of the invention. According to FIG. 3, the target system has two memory areas: fast memory 300, which will likely be closer to the CPU and relatively small in storage capacity, and slow memory 310, which will likely be further from the CPU and relatively larger in storage capacity. The application depicted includes two application functions, FastApp( ) 301 and SlowApp( ) 311. The first application function, FastApp( ) 301, is a small, frequently-called, and performance-critical function to the overall application. The second application function, SlowApp( ) 311 is larger, rarely-called, and less important to the overall performance of the application.

FIG. 3 likewise depicts two library functions, FastLib( ) 302 and SlowLib( ) 312. FastLib( ) 302, like FastApp( ) 301, is a smaller, more frequently called, and more performance critical library function, while SlowLib( ) 312, like SlowApp( ) 311, is slower and larger and need not be accessed as quickly to insure overall application performance. According to this example, both of library functions FastLib( ) 302 and SlowLib( ) 312 are part of the same library.

According to this example, the target system's fast memory 300 does not have the capacity to store more than two of the four functions. There thus arises the problem in insuring that both of the fast functions—FastApp( ) 301 and FastLib( ) 302—are properly mapped to fast memory 300, and that the slower functions—SlowApp( ) 311 and SlowLib( ) 312—are mapped to slow memory 310. If a default configuration is used, the linker may not obtain the desired result. Unless the linker is provided with additional information (as will be described below), both FastLib( ) 302 and SlowLib( ) 312 are functions that are part of the same library, and thus both may be mapped to the same default section, and both functions are used by both of the application functions FastApp( ) 301 and SlowApp( ) 311.

Figure 4:
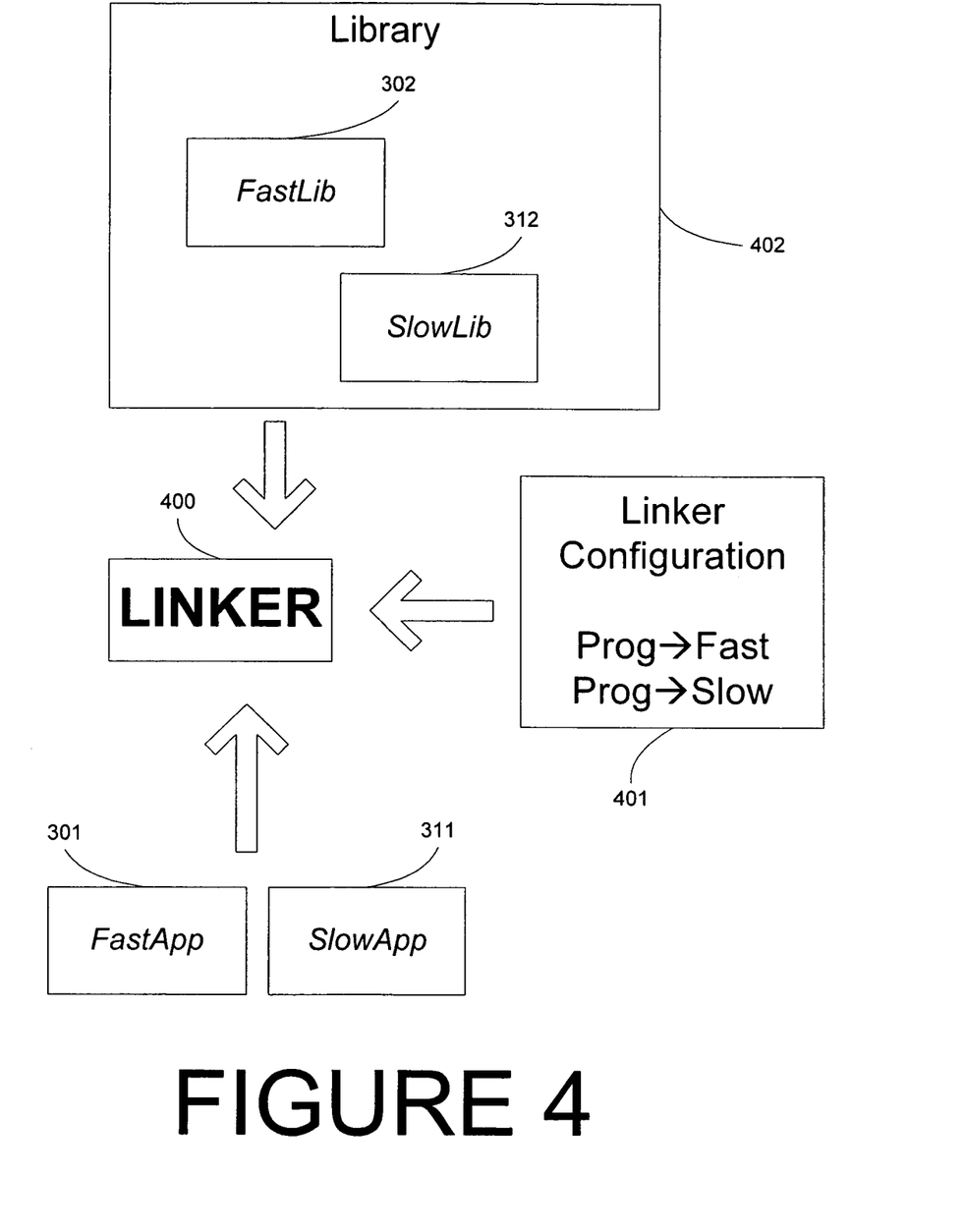
FIG. 4 is a schematic illustration of the various inputs into a linker when linking the application illustrated in FIG. 3.

FIG. 4 depicts the inputs to the linker 400 resulting from the functions described above. The linker 400 receives input from the two application functions FastApp( ) 301 and SlowApp( ) 311 as well as the two library functions FastLib( ) 302 and SlowLib( ) 312, both of which are part of a single library 402. Finally, the linker 400 receives configuration instructions 401.

"Fall-Through" Placement

Figure 5:
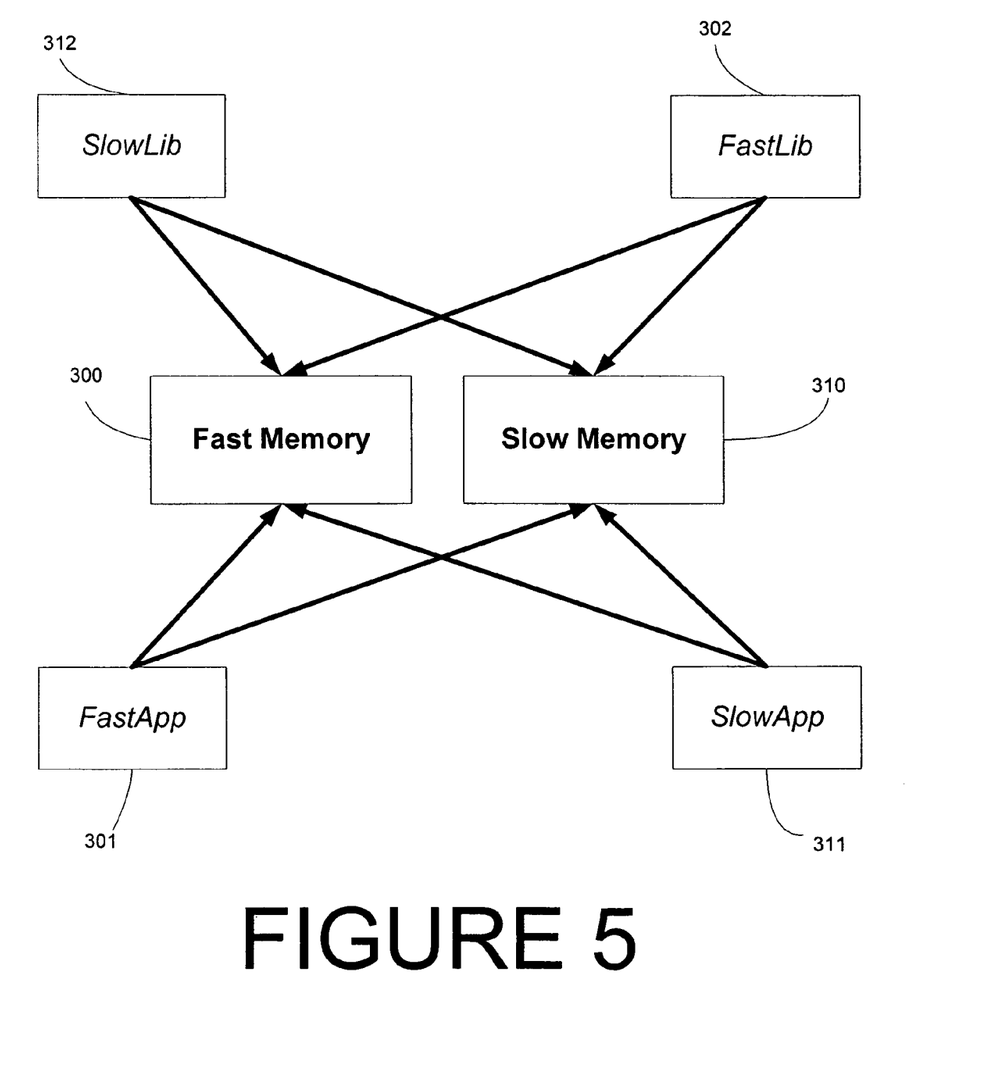
FIG. 5 is a schematic illustration of the various possible mappings by a linker into slow and fast memory of the objects illustrated in FIG. 3.

In the standard configuration, the linker will simply map the default sections into memory in a "fall-through" manner as discussed above. If the linker 400 simply uses a "fall-through" approach, there are a number of potential mappings of functions to memory areas. Those mappings are depicted in FIG. 5. As can be seen from FIG. 5, using a "fall-through" approach, each function may be mapped to either fast memory 300 or slow memory 310, depending on the order in which the sections are mapped and the total storage capacity of each memory area.

The programmer might attempt to control placement of FastApp( ) 301 and SlowApp( ) 311 by specifying non-default sections for each function, or alternatively by manipulating the linker's search path so that SlowApp( ) 311 will only be found at the end of the search path, after the library 402. Even if the programmer specifies an alternative search path, however, the programmer cannot be sure that the linker 400 will place FastApp( ) 301 in fast memory 300 and SlowApp( ) 311 in slow memory 310. Moreover, in many cases, the programmer does not have the option to specify non-default sections to library functions because libraries are often provided only in pre-compiled form, and thus the programmer does not have access to source code to modify and rebuild specifying non-default sections.

Another approach might be to divide the library 402 into two separate libraries, F and S, and then place F in the search path earlier than S. This approach may present difficulties, however, in the case where FastLib( ) 302 is not a single function but rather a collection of functions, only one of which is publicly accessible to the programmer. In that case, the programmer would need to identify and place into the F library each and every function required by FastLib( ) 302. This task may be burdensome and costly, and may need to be repeated for each new release of the library to insure that all functions are properly located.

The problem may be more difficult in the case where both FastLib( ) 302 and SlowLib( ) 312 each consist of code, dynamic data, and constant data, each of which may have different placement requirements. For example, a fast, frequently-used function may rely on a large, low-usage look-up table that should be stored in read-only memory, but which also contains a cache of frequently-accessed items in faster memory. These sorts of problems are particularly common when software is developed for the embedded environment where there may be numerous constraints on library placement that are application-specific, that change from one development to the next, and that are not addressed by the libraries' standard placement mechanisms of search order and section name. Accordingly, the invention provides a more flexible means for placing binary objects in memory than simply altering the search order or section name.

File Attributes

According to a first aspect of the invention, the object file format is extended to permit the storage of arbitrary file attributes. File attributes consist of metadata that can be used by the linker to select and place binary objects in memory. In a preferred embodiment, each file attribute consists of a name and value pair, where the name and values are each arbitrary strings. Each object file may have any number of name and value pairs, and there may be multiple name and value pairs with the same name. The metadata contained in the file attributes are not necessarily included by the linker in the final executable binary of the application; instead, the metadata can be used by the linker to select and locate binary objects in memory.

Enhanced Libraries

According to a second aspect of the invention, the object files within libraries are enhanced to each carry any number of arbitrary file attributes. As described above, in a preferred embodiment, file attributes can consist of any name and value pair, and thus are unlimited in terms of the parameters they can specify. In a preferred embodiment, examples of file attributes of an object file include:

A list of functions defined within the object file;
The publicly-documented interface to which the object belongs;
Functional groupings to which the object belongs. For example, the file attribute could indicate that the object performs input/output tasks, mathematical computations, memory management, or other sorts of tasks.
The kind of contents the object file contains, such as whether the object file contains code or data, and whether the contents are read-only or read/write.
Suggestions to the linker as to the best placement in memory for the contents of the object file.

The above list of file attributes is not exhaustive and is not intended to be a limiting feature of the invention; instead, this list is provided to give examples of the sorts of properties that can be coded using file attributes.

Another example of file attributes that can be provided for an object are those automatically applied by Analog Devices VisualDSP++4.5 C/C++ Compiler when compiling source code into objects. This compiler applies, for example, a "content" attribute automatically to code when it is compiled. The following table illustrates various values of the "content" attribute and their significance for the linking process:

| Value | Meaning |
| --- | --- |
| CodeData | This value indicates that the binary object contains a mix of content types. |
| Code | This value indicates that the binary object does not contain any global data, only executable code. This can be used by the linker to map binary objects into program memory, or into read-only memory. |
| Data | This value indicates that the binary object does not contain any executable code. The binary object may not be mapped into dedicated program memory. The kinds of data used in the binary object vary. |
| ZeroData | This value indicates that the binary object contains only zero-initialized data. Its contents must be mapped into a memory section that is filled with zeros on startup, to ensure correct initialization. |
| InitData | This value indicates that the binary object contains only initialized global data. The contents may not be mapped into a memory section that is filled with zeros on startup. |
| VarData | This value indicates that the binary object contains initialized variable data. It must be mapped into read-write memory, and may not be mapped into a memory section that is filled with zeros on startup. |
| ConstData | This value indicates that the binary object contains only constant data (e.g., data declared with the C const qualifier). The data may be mapped into read-only memory. |
| Empty | This value indicates that the binary object contains neither functions nor global data. |

Yet another example of file attributes that can be provided for an object are those included in the runtime libraries provided with Analog Devices VisualDSP++C/C++ compiler, illustrated in the following table:

| Attribute Name | Meaning of attribute and value |
| --- | --- |
| libGroup | A potentially multi-valued attribute. Each value is the name of a header file that either defines the object, or that defines a function that calls the object. |
| libName | Identifies the library that contains the object. For example, if the object is contained in a Digital Signal Processing (DSP) library, the libName attribute can be set to 'libdsp.' |

| Attribute Name | Meaning of attribute and value |
| --- | --- |
| libFunc | The names of all the functions in the object. libFunc will have multiple values, as both the C and assembly linkage names will be listed. libFunc will also contain all the published C and assembly linkage names of objects in the object's library that call into the object. |
| prefersMem | One of three values: internal, external or any. If the object contains a function that is likely to be application performance critical, it will be marked as internal. If a function is deemed unlikely to be essential for achieving the necessary performance it will be marked as external. |
| prefersMemNum | Analogous to prefersMem but takes a numeric string value. This attribute can be used to provide a greater measure of control over the placement of binary object files than is available using the prefersMem attribute. |
| FuncName | Multi-valued attribute whose values are all the assembler linkage names of the defined names in the object. |

Object-Filtering Phase

In a third aspect of the invention, an enhanced linker is provided to filter object files based on various file-attribute filters. These filters operate by taking an object- or library-file list as an input, and applying Boolean expressions to test the presence and value of particular file attributes for each separate object file and for each object file within a library. After the filter is applied, the linker will have a list of object files for which the Boolean expression evaluated as true.

The resulting lists then constitute the search path for specific section mappings. According to this embodiment, each section-to-memory mapping may have its own independent filter. The result of the filtering phase is that virtual libraries and search paths are created for the linker that only contain the object files that meet the filter expression requirements.

Example Application

Returning to the example application depicted in FIG. 3, the file attributes described above can be used to insure that the various objects are optimally placed for a target system. According to this example, the library has been compiled into an object file with several file attributes added. These attributes could include the following:

FuncName: the name of each function, added automatically by the compiler.

libName: the name of the externally-visible function to which each function belongs, added explicitly by the library maintainer.

prefersMem: an attribute for each function with a value of either "fast" (or "internal") or "slow" (or "external"), depending on whether the function would be better placed in fast or slow memory. This parameter can be added explicitly to certain functions based on the library maintainer's judgment.

Once the library has been built with these file attributes, the programmer has the ability to control placement of functions in memory using various filters at the linking stage. For example, in the simple case depicted in FIG. 3 where FastLib( ) 302 and SlowLib( ) 312 are each only one individual function, the programmer can create a filter using the FuncName file attribute, and specify the following linker configuration:

program {FuncName==FastApp||FuncName==FastLib}? Fast
program ? Fast
program? Slow According to this example linker configuration, the functions with the FuncName file attribute "FastApp" and "FastLib" will be mapped to fast memory 300 first. This will insure that FastApp( ) 301 and FastLib( ) 302 are mapped to fast memory 300, as shown is FIG. 3. Once FastApp( ) 301 and FastLib( ) 302 have been mapped, according to the example configuration above, the linker will place program sections as in the default "fall-through" configuration, where all remaining sections are first mapped to fast memory 300 until there is no more space and all other sections are then mapped to slow memory 310. Note that according to this example, the library developer need not have taken any special actions to specify file attributes, as the compiler can add the FuncName attribute automatically at compile time.

In a slightly more complex example, FastLib( ) 302 and SlowLib( ) 312 could be public interfaces to a whole set of internal functions. In this case, the programmer can use the libFunc file attribute to insure that FastLib( ) 302 and its dependencies are mapped to fast memory 300, and SlowLib( ) 312 and its dependencies are mapped to slow memory 310. Unlike the example above, here the library developer must specify the libFunc attribute for each function so that the dependencies for FastLib( ) 302 and SlowLib( ) 312 can be identified by the linker. All of the internal dependencies for FastLib( ) 302 will have the file attribute LibFunc="FastLib," and all of the internal dependencies for SlowLib( ) 312 will have the file attribute LibFunc="SlowLib." According to this example, the following linker configuration will provide the desired result:

program {FuncName==FastApp||libFunc==FastLib}? Fast
program ? Fast
program ? Slow One beneficial feature of this embodiment becomes clear when the library is developed by someone other than the application programmer. The application programmer need not know the internal details of the library developer's implementation of FastLib( ) 302 and SlowLib( ) 312. Instead, the programmer only needs to know the name of the public interface in order to specify to the linker how the function and its dependencies should be placed. Thus, even if the programmer only has the object code and not the source code for the library to be linked, it is still possible to specify filters to insure proper placement of the various sections of the object file.

In yet another example, the programmer can use file attributes to specify further control to insure proper placement of binary objects. Following is another example of a linker configuration file in accordance with a preferred embodiment:

program {prefersMem=="fast"}? Fast
program {prefersMem!="slow"}? Fast
program ? Fast
program ? Slow According to this example, the linker will first map to fast memory program sections that have been tagged with the file attribute prefersMem where that attribute is set to "fast." The linker will then map program sections that have not been marked with as "slow" to fast memory. Finally, any remaining program sections that can fit in fast memory will be mapped to fast memory, and all other program sections will be mapped to slow memory.

In an alternative embodiment, the convention could also be extended to provide for more than two types of memory under another attribute; for example, it may be necessary in the embedded environment to have certain objects reside in flash memory so that it is available during boot-up. The value for this attribute could thus be used to specify that location. Attributes could also be used to set up a set of priorities for placement in various levels of fast and slow or external and internal memory, so that the linker can make finer distinctions between several objects that all prefer fast or slow memory.

In another embodiment, the linker itself automatically recognizes the prefersMem attribute and allocates binary objects according to the order shown above, without needing to be specifically instructed to do so with a linker configuration file.

In another aspect of the invention, it is not essential that the linker actually comply with the file attributes. The linker could, for example, attempt to fit objects into fast memory as specified by the file attributes and linker configuration, but if insufficient memory is available, the linker could gracefully fail back to a placement that works, for example, by mapping some objects labeled as "fast" to slow memory if necessary to build the application. Likewise, the linker could place objects labeled as "slow" in fast memory if there remains fast memory available after all objects labeled as "fast" have been located.

It will thus be clear to one of ordinary skill in the art that file attributes can be extended and used for a wide variety of purposes to facilitate better control by the programmer at the linking stage. For example, in a multi-processor or multi-core architecture, some memory may be shared between multiple processors or cores will other memory may be private to each processor or core. According to one embodiment of the invention, the programmer could use file attributes to specify which binary objects should be placed in private memory and which objects should be placed in shared memory. It should also be noted that in the case of dynamic linking, the linking stage is not completed until run-time. The flexible extension and location of objects according to file attributes could thus also occur at run-time.

As another example, file attributes could be used to build applications for architectures that have memory that can be accessed via a data cache as well as by Direct Memory Access (DMA). File attributes can be used to select different objects depending on whether DMA-accessed memory is also being cached. In yet another example, file attributes can be used to follow constraints imposed by the needs of address-translation hardware in a system with virtual memory. In yet another example, file attributes can be used to select and locate different objects for a system with several layers of memory, each with its own performance and capacity characteristics. In yet another example, file attributes can be used to select and locate different objects according to whether they include developer debugging information.

File attributes and the corresponding linker filtering stage thus provide a more flexible approach to selecting and locating objects and sections based on the particular design of libraries and applications as well as the target hardware than the method of simply selecting and placing objects based on a predetermined search order. Each library may contain a wide variety of file attributes, each representing a different way of dividing up the components of the library, and the programmer may then decide which file attributes are important to a particular project and instruct the linker to filter the objects accordingly.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of linking a program targeted for use on an embedded processor based on attributes stored with the code, the method comprising:

modifying an object code file to include metadata that includes a file attribute that describes memory characteristic preferences for the object code file to determine placement in at least one of the plurality of memories accessible by the embedded processor, wherein the file attribute is metadata stored with the object code file and wherein the attributes describe storage preferences in a plurality of memories of different types accessible by the embedded processor; and accessing the file attribute of the object code file applying an attribute-based filter that maps the object code file to at least one of the memories based on the memory characteristic preferences for the object code file included in the file attribute, wherein the metadata includes a name and value pair; and modifying the linker program to obtain a list of object files that meet the criteria of the attribute-based filter for a specific expression to create a virtual library and search path for the linker program.

2. The method of claim 1, further comprising modifying the linker program to map the object code file to a second memory preference when a first memory preference includes insufficient space for the object code file.

3. The method of claim 1, further comprising modifying the linker program to map object code files by taking into account the file attributes and characteristics of the embedded processor and of the memories accessible to the embedded processor.

4. The method of claim 1, wherein the file attribute specifies whether the object code file is placed in shared memory or private memory.

5. The method of claim 1 wherein the value of the name-and-value pair identifies the object code file as containing one of code and data, code, data, zero-initialized data, initialization data, variable data, constant data, and empty.

6. The method of claim 1 wherein the value of the name-and-value pair includes one of a library group, a library name, a library function, a preferred memory location, a numeric preferred memory location, and a function name.

7. A non-transitory computer readable medium storing executable instructions that provide a linker program, the linker program performing the steps comprising:

building an executable binary file adapted for use on an embedded processor having a plurality of memories of different types, wherein building the executable binary file comprises combining object code files and arranging components in memory address ranges that are accessible by the embedded processor;

accessing a file attribute associated with an object code file to obtain mapping preferences for the object code file to at least one of the memories wherein the file attribute comprises metadata stored with the object code file, and wherein the metadata includes a name and value pair;

applying a metadata-based filter to the object code file to map the object code file to at least one of the memories and to arrange placement of the object code file in the at least one of the memories based on the mapping; and obtaining, by the linker program, a list of object code files that meet the criteria of the attribute-based filter for a specific expression to create a virtual library and search path for the linker.

8. The non-transitory computer readable medium of claim 7, wherein the attribute-based filter includes Boolean expressions that test the name and value pair of the file attribute.

9. The non-transitory computer readable medium of claim 7, wherein the executable instructions further perform the steps of mapping the object code file to a second memory preference when a first memory preference includes insufficient space for the object code file.

10. The non-transitory computer readable medium of claim 7, wherein the executable instructions further perform the steps of mapping object code files, by the linker program, by taking into account the file attributes and characteristics of the embedded processor and of the memories accessible to the embedded processor.

11. The non-transitory computer readable medium of claim 7, wherein the file attribute specifies whether the object code file is placed in shared memory or private memory.

12. The non-transitory computer readable medium of claim 7 wherein the value of the name-and-value pair identifies the object code file as containing one of code and data, code, data, zero-initialized data, initialization data, variable data, constant data, and empty.

13. The non-transitory computer readable medium of claim 7 wherein the value of the name-and-value pair includes one of a library group, a library name, a library function, a preferred memory location, a numeric preferred memory location, and a function name.

14. A computer-implemented method of linking code for an embedded processor based on attributes stored with the code the method comprising:

storing with an object code file in a computer readable memory a file attribute that describes memory characteristic preferences for the object code file to determine placement in at least one of a plurality of memories accessible by the embedded processor, wherein the file attribute comprises metadata stored with the object code file, and wherein the metadata includes a name and value pair; and storing a linker program in a computer readable memory that accesses the file attribute of the object code file and applies an attribute-based filter to map the object code file to at least one of the plurality of memories accessible by the embedded processor based on the memory characteristic preferences for the object code file included in the file attribute, wherein the attribute-based filter includes placing of frequently-accessed objects in faster memory and obtains a list of object files that meet the criteria of the attribute-based filter for a specific expression to create a virtual library and search path for the linker program.

15. The method of claim 14, wherein the attribute-based filter includes Boolean expressions that test the name and value pair of the file attribute.

16. The method of claim 14, wherein the file attribute specifies whether the object code file is placed in shared memory or private memory.

17. The method of claim 14 wherein the value of the name-and-value pair identifies the object code file as containing one of code and data, code, data, zero-initialized data, initialization data, variable data, constant data, and empty.

18. The method of claim 14 wherein the value of the name-and-value pair includes one of a library group, a library name, a library function, a preferred memory location, a numeric preferred memory location, and a function name.

* * * * *